3,303,047
PRESSURE-SENSITIVE ELEMENT AND PROCESS FOR PREPARING SAME
John Edwards Castle, Hockessin, and Halsey Bidwell Stevenson, Wilmington, Del., assignors to E. I. du Pont de Nemours and Company, Wilmington, Del., a corporation of Delaware
No Drawing. Filed Mar. 11, 1964, Ser. No. 351,201
13 Claims. (Cl. 117—65.2)

This invention relates to a novel pressure-sensitive element, useful for replication of surfaces, and to a process for preparation of the element.

Replication of surfaces is an important technique for the determination of surface properties, particularly surface differences or defects, many of which are not apparent on visual observation. Even direct magnification of the surface is not satisfactory for measurement of many undesired irregularities, particularly when they may involve differences of even less than 2 to more than 2000 microinches. Some of the difficulties associated with standard methods of forming a replica are in the requirements of surface treatment, use of solution of material which sets up to form the replica, removal of the replica, stabilization of the replica and post-treatment to enable optical measurement of the irregularities to be made. Also associated with standard methods is the fact that the technique is generally limited to flat surfaces which must be inert to volatile solvents for the mold-forming materials that are employed.

In assignee's McNutt III, U.S. application Ser. No. 262,848, filed Mar. 5, 1963, now abandoned, there is described a novel process for the replication of solid surfaces. The process comprises (a) Applying to a surface of a solid article having microscopic physical differences, e.g., in height or in hardness between the lower and higher strata or surfaces thereof, a layer of opaque, porous pressure-sensitive material having microscopic-size voids therein communicating with the surface of said layer, (b) Applying localized pressure to the outer surface of said layer, (c) Removing said layer from the surface of the article, and (d) Amplifying a replica area in the surface of said layer which area results from the applied pressure.

An object of this invention is to provide a new and useful element having a pressure-sensitive surface that is useful for surface replication. Another object is to provide such an element which is useful in the process of the McNutt application. Yet another object is to provide such an element which is simple, economical, dependable and will not injure the surface of the solid of which the replica is to be made. A further object is to provide a simple and practicable process for making such an element. Still further objects will be apparent to those skilled in the art from the following description.

The pressure-sensitive element of this invention that is useful for the replication of surfaces comprises, in order:

(a) A pressure-insensitive, flexible sheet support;

(b) A layer of opaque, porous, pressure-sensitive material having microscopic-size voids, and (c) A stratum approximately $0.1 \times 10^{-6}$ to $10^{-3}$ inch in thickness of a metal having a hardness of less than 3 on Mohs' scale.

The pressure-sensitive elements, just described, can be prepared in accordance with the invention by (1) First pressing the surface of a collapsible porous polymer film to provide a smooth surface but at insufficient pressure to collapse substantially all of the pores, and (2) Then depositing a reflective film of a soft metal on the smooth surface of the porous layer.

The following description provides further details on the pressure-sensitive layer, and flexible elements having such a layer and a thin deposit of the soft metal, and their preparation.

DESCRIPTION OF POROUS FILMS AND THEIR PREPARATION

Readily available porous, opaque, pressure-sensitive or -collapsible layers and elements having such layers on a pressure-insensitive film which are useful for the present invention have been described in Bechtold U.S. Patents 2,846,727, 2,848,752 and 2,957,791 and in assignee's U.S. applications Stevenson Ser. No. 176,134, filed Feb. 27, 1962, now abandoned, and McNutt Ser. No. 262,848, filed Mar. 5, 1963, now abandoned.

Preferred layers subject to metal deposition are open-cell porous films that have smooth surfaces. The porous films are of an organic polymer, preferably of hydrophobic vinyl-type addition monomers. The monomers are selected from the group consisting of vinyl and vinylidene monomers with said polymer having a wholly carbon chain, a molecular weight of at least 10,000, and a softening temperature of preferably 50–100° C. as determined by ASTM test number D–648–56, the units of the polymer having an average molecular weight of below 150 and preferably above 45. The films have an open-cell structure characterized by microscopic voids disposed throughout and communicating with the surface, the open-cell voids, as measured by a conventional mercury intrusion method, some of which may be as large as 2 microns but generally of substantially uniform size averaging less than a micron and preferably less than ½ micron in size and constituting 20% to 80% by volume of the films, said films (a) having a degree of opacity such that a thickness of 3 mils and greater has a light transmission of less than 10% at 4000 A., and upon being subjected to pressure of about 10,000 pounds per square inch at room temperature has at least a 3-fold increase in light transmission, and (b) sustaining a permanent reduction in thickness of about 20% to about 80% when subjected to such pressure and temperature. The low bulk density films are highly permeable, their permeability to water vapor being at least 10 times greater than the corresponding films of the same polymer and thickness which are non-porous or which have closed-cell voids. The films or coatings, because of the microscopic void structure, are highly opaque. The bulk densities of the films, in general, are from about 0.25 to 1.0 gram per cc. The opacity of these films is such that not more than 10%, generally 5% or less, of light is transmitted (measured at 4000 A. on G.E. Spectrophotometer Cat. 5962004G65) using films of about 3 mils thickness, whereas after clearing or collapsing the pores by use of pressures of about 10,000 pounds per square inch at least three times as much light is transmitted as by the original film.

Base elements that have such qualities can be obtained by several techniques. A particularly useful method is to (a) coat an inert flexible, non-fibrous, dimensionally stable support with a solution of the vinyl polymer (especially vinyl halide polymer or copolymer having minor amounts of acrylic ester, nitrile or acid and/or vinyl ester)

in a water-soluble dialkylamide solvent that contains water (in an amount insufficient to cause precipitation of polymer), (b) treat the coating with water to coagulate the layer of polymer, and (c) remove the water from the coating. For the purpose of the present invention, a moderately low molecular weight vinyl chloride homopolymer or copolymers of vinyl chloride with methyl acrylate 75/25 are particularly useful since such have preferred porosity and adhesion to the substrate. Additives such as pentaerythritol ester of abietic acid can also be present to provide softer films.

The pores in films obtained as described above are in the range of 0.1–2 microns with the smallest pores near the top surface where most rapid coagulation of polymer occurs. Slower coagulation, particularly with water containing more polymer solvents, gives larger pores and such are found at the base of the film, i.e., where the film is bonded to the non-porous flexible substrate. The latter is dimensionally stable and should, e.g., have a modulus range of 200 to $800 \times 10^3$ pounds per square inch. Useful films are of oriented polyethylene terephthalate or of oriented polypropylene. The substrate film should be uniform in thickness which is preferably of the order of 2–5 mils in thickness with the porous polymer coating being about 0.5 to 2.5 mils in thickness and preferably about 0.7 to 1.5 mils.

PREPARATION OF SMOOTH TOP SURFACE ON POROUS FILM

Films of open-celled, pressure-collapsible, porous, opaque polymers such as obtained by the method described above are further characterized by a microscopically pebbled surface such as exhibited by unsplit kid leather. Such a surface is not generally satisfactory for use in the surface replication process of this invention since the original surface irregularities, under most conditions, would be observed in the final product. To remove the surface irregularities, the film is subjected to compression by a smooth (flat) surface with a force that is insufficient to collapse all of the pores but sufficient to provide a smooth evenly reflective surface. A suitable method for obtaining the smooth surface is by use of rolls that are extremely smooth and capable of fine adjustment, e.g., by use of jeweler's rolls or the equivalent. The compressive force is sufficient to reduce the thickness about 30–80% of the total that the original porous layer can be compressed. For example, if a film has about 75% void space, i.e., can be compressed 75% to collapse all of the pores, preferred properties are attained when the surface has been pressed by a smooth roll or plate to such an extent that approximately 30–60% reduction in thickness occurs. Considerable care must be taken in this operation to use smooth surfaces in such a manner that the surface of the porous film should not stick or be subject to shearing. The use of antistatic and antistick agents on calenders, rolls, or flat surface is useful to avoid difficulties with this pressing operation. Useful pressures employed are of the order of 2000–5000 pounds per square inch. Preferred products are obtained when a polyethylene terephthalate substrate of about 2–5 mils thickness is coated with a porous polymer (containing about 75% pores) of about a mil in thickness which is reduced to a thickness of about 0.6–0.7 mil by uniform pressing on its surface.

COATING SMOOTH POROUS FILM WITH METAL

The smooth surface of the porous film is next given a thin coating of a soft metal. Suitable soft metals are those having a hardness of less than 3 on the mineral scale and include such metals as aluminum, cadmium, indium, gold, silver, tin, and zinc. The metal should be resistant to corrosion, soft, ductile and easily deformed, have good adhesion to the porous film of organic polymer and have good optical reflectivity.

The specific technique for formation of the metal coating on the deformable film will depend on the film and the metal. Since a porous organic material is employed, the conditions of coating should be such that the structure of the organic polymer is not further deformed, e.g., the temperature of coating should be below the softening temperature of the polymer. Useful methods include deposition from solution and vacuum evaporation techniques (e.g. at $10^{-3}$ to $10^{-7}$ mm. Hg) sufficient to give a surface that reflects over 50% of light. In general, it is of the order of 0.0001 to 0.05 mil and generally 0.01 to 0.04 mil in thickness.

The metal coated film, due to the smooth surface, has a mirror-like reflective surface. Films prepared as above but without the pressing or rolling step to provide a smooth surface do not exhibit mirror-like reflection.

FORMATION OF SURFACE REPLICA ON METAL-COATED FILM

The replication step is easy to carry out. The surface whose possible irregularities or defects are to be determined needs no special preparation other than to be sure foreign objects are removed. The metallized surface of the film previously described is placed against the solid surface of the metal or similar object.

Localized pressure can be applied to the pressure-sensitive layer in various ways against the back surface of the pressure-sensitive layer while its front surface is in contact with the solid surface. Pressure is applied through the thin layer support for the pressure-sensitive porous polymer and thin metal coating. The support is relatively non-pressure-sensitive but is flexible and transmits pressure.

As disclosed and claimed in the McNutt III application, the localized pressure for replication may be from a single or series of blows from an instrument having a rounded or curved striking or contacting surface, or by pressing, rubbing, or rolling such a surface on the back surface of the pressure-sensitive layer or element bearing the layer. A vibrating element having a ball-shaped end of about 3/8" to 5/8" diameter is quite useful; also a flexible plastic spatula with a gently curved striking surface. The spatula can be gently pounded to provide sharp single blows. Requirements of the pressure source are not exact, e.g., rubbing with the back of a fingernail, or a firm pencil eraser, are satisfactory. This is of particular advantage in that the replica can be obtained of curved surfaces in difficult places, vertical or overhead positions and the operation has no adverse effect on the surface subject to the process. The resulting replica is readily removed and transported for further determination of possible defects.

The pressure necessary to produce the replica is of the order required to collapse most of the remaining pores in the porous pressure-sensitive organic polymer layer. This is dependent upon the original polymer composition but is generally of the order of 3000–10,000 pounds per square inch.

DETERMINATION OF DIFFERENCES IN HEIGHT IN REPLICA

Variations in the original hard surface whose defects are to be determined are seen in the replica. These variations are generally much too small for direct visual observation and amplifying or augumenting the replica area can be accomplished as disclosed and claimed in the McNutt III application. For example, it can be accomplished by optically enlarging the replica area formed in the surface of said layer by a photograph or photomicrograph of the enlarged area with conventional photographic apparatus by allowing incident light rays to fall upon the replica area at an angle and the reflected rays made to expose a photographic layer is one method. Apparatus which can be used to form the enlarged photographic image record are metallurgical microscopes, metallographs and toolmakers' microscopes. Instead of making a photomicrograph, the optical enlargement can be focused on a viewing screen. A permanent record of the screen image can be made in any suitable manner.

A further method involves amplifying the surface of film by connecting a stylus to a suitable electric meter and pass the stylus over the surface of the replica area and the differences in the height of the surface area noted on the meter. A further and preferred method involves the use of interferometer microscopes.

The invention will be further described in but is not intended to be limited to the following examples.

*Example I*

A solution of 10 parts by weight of a moderately low molecular weight polyvinyl chloride, 15 parts of pentaerythritol abietate, 1 part of the condensation product of diphenylolpropane/epichlorohydrin, 50 parts of dimethylacetamide, and 1.8 parts of water is coated on a 2-mil thick polyethylene terephthalate film, washed with water and dried. The coating is 1-mil thick of an opaque layer containing about 5% void space in the form of open-celled pores.

Strips of the coated film are passed through smooth jewelers' rolls set at a thickness of about 2.65 mils such that the coated film is subject to about 35% compression which results in the formation of a smooth dense surface with collapse of the fine pores at the surface.

The resulting film (smooth vinyl chloride side) is subjected to vacuum evaporation by metallic indium to give a thickness of about 0.03–0.04 mil of the indium.

A small piece of the above film (about a square inch in size) is placed on a metal surface of which a replica is desired with the indium-coated side against the metal. The polyethylene terephthalate film is gently tapped with a plastic spatula having a spoon-shaped curved end. The film bearing the replica is removed and the surface checked by optical microscopy to show the nature of the original.

*Example II*

A 14% solution of a vinyl chloride/methyl acrylate (75/25) copolymer in dimethylformamide containing 4% of added water is coated on a substrate sheet of 2-mil thick polyethylene terephthalate using a 3-roll coater. The film is passed into water to coagulate the polymer and washed to remove dimethylformamide. The coating obtained is about 1.0 mil thick. Surface smoothing and compressing is effected as described in Example I. The opaque film is coated with silver by the procedure described in GPO-PIA Joint Research Bulletin PL-2 (1950), "Electrotyping in the Government Printing Office," pages 6–7. This involves sensitizing the opaque porous surface with a solution of stannous chloride in isopropyl alcohol, then simultaneously spraying the surface with (a) $AgNO_3/H_2O/NH_3$ solution and (b) triethanolamine/formalin to give a thin silver film.

Film coated by this general procedure is then used for replication as described above.

Although porous collapsible-coated film obtained as described above is preferred for use in preparing the metallized product for replication, useful porous film can be prepared by other methods, e.g., 6% solutions of polyvinyl chloride polymers and copolymers in tetrahydrofuran containing less than 50% n-butyl alcohol and about 1½% of polyvinyl acetate can be coated on a substrate to give a useful product.

The metal-coated film of this invention can be used to obtain replicas of solid surfaces of many different types, e.g., ground, polished, plated or coated, and curved or flat of solid material including metal, glass, ceramic, plastic, crystals, gems, and other shaped articles, including films, fibers, foils, balls, cylinders, and even finely reticulated parts or areas of microscopic size, e.g., in spinnerettes. In general, the surfaces replicated should be at room temperature or at a temperature which would not affect the pressure-sensitive layer.

The wear defects of guns, engine blocks, bearing and other carefully machined metal parts can be readily determined. The invention is of considerable utility in metallographic techniques, in quality control of metal coatings and glass surfaces, e.g., plate glass, lenses and for characterization and specification of textile (e.g., yarn contact surfaces) wear surfaces, or for yarn or fiber surfaces themselves.

It is obvious that the invention has numerous advantages. Thus, it permits three-dimensional surface replication and read-out of the replica. The use of the product requires little time, and does not damage the surface during application or removal of the replica. Replicas of high resolution and detail are obtained.

The new surfaces replication elements are relatively inexpensive, rapid, extremely accurate and provide records for permanent retention. Replication can be obtained from the surfaces in a matter of seconds, thus with little or no interruption of the operation of many machines, apparatus, etc.

The pressure-sensitive element can be applied onto difficult-to-reach surfaces by means of pressure-sensitive tape and thereby held in position until pressure is applied with a suitable instrument. Sampling replica can be made at desired spots on large surfaces to determine surface uniformity over wide areas.

The metal coated, pressure-sensitive elements of this invention have a smooth although porous reflective surface and give results superior to those obtained with the unpressed, uncoated, pressure-sensitive elements proposed for use in the McNutt III application. The pressure-sensitive layers of the latter have surface irregularities that prevent obtaining the greatest accuracy on readout.

We claim:
1. A pressure-sensitive element comprising, in order:
   (a) a pressure-insensitive, flexible sheet support;
   (b) a smooth layer of opaque, porous, pressure-sensitive material having microscopic-size voids, and
   (c) a stratum approximately $0.1 \times 10^{-6}$ to $10^{-3}$ inch in thickness of a metal having a hardness of less than 3 on Mohs' scale.
2. An element according to claim 1 wherein said metal is indium.
3. An element according to claim 1 wherein said layer has a thickness of about 0.6–0.7 mil.
4. An element according to claim 1 wherein said material is a vinyl compound addition polymer.
5. An element according to claim 1 wherein said material is a vinyl chloride addition polymer.
6. An element according to claim 1 wherein said material is a vinyl chloride/methyl acrylate addition copolymer.
7. An element according to claim 1 wherein said support is polyethylene terephthalate.
8. A process for making a pressure-sensitive element which comprises
   (1) pressing the surface of a layer of opaque, porous, pressure-sensitive material having microscopic-size voids on a pressure-insensitive flexible sheet support at a pressure insufficient to collapse all of the pores but sufficient to form a smooth, evenly reflective surface, and
   (2) then depositing a reflective film of a soft metal on the smooth surface of the porous layer.
9. A process according to claim 8 wherein said metal is indium and it is deposited by evaporation of indium at a pressure of $10^{-3}$ to $10^{-7}$ mm. Hg.
10. A process according to claim 8 wherein the compressive force is sufficient to reduce the thickness about 30–80% of the total amount the original porous layer can be compressed.

11. A process according to claim 8 wherein said material is a vinyl compound addition polymer.

12. A process according to claim 8 wherein said material is a vinyl chloride addition polymer.

13. A process according to claim 8 wherein said material is a vinyl chloride/methyl acrylate addition polymer.

References Cited by the Examiner

UNITED STATES PATENTS 3,000,757  9/1961  Johnston et al. _____ 117—63

R. S. KENDALL, *Primary Examiner.*

J. R. BATTEN, JR., *Assistant Examiner.*